United States Patent [19]
Antonio

[11] 3,727,216
[45] Apr. 10, 1973

[54] ELECTROMAGNETIC AND ULTRASONIC DOPPLER CORRELATION INTRUSION ALARM SYSTEM

[75] Inventor: John Antonio, Fairfield, Conn.

[73] Assignee: The Mosler Safe Company, Hamilton, Ohio

[22] Filed: Jan. 28, 1971

[21] Appl. No.: 110,735

[52] U.S. Cl. ............. 343/5 PD, 340/3 D, 340/258 A, 343/6, 343/7.7
[51] Int. Cl. ................................................. G01s 9/42
[58] Field of Search ..................... 340/258 A, 258 B, 340/3 D; 343/5 PD, 7.7, 6

[56] References Cited

UNITED STATES PATENTS

| | | | |
|---|---|---|---|
| 2,502,317 | 3/1950 | Ewing | 343/6 R |
| 3,471,846 | 10/1969 | Cotter et al. | 340/258 |
| 3,383,678 | 5/1968 | Palmer | 343/7.7 X |
| 3,509,791 | 5/1970 | Pechamat et al. | 89/135 |
| 3,163,861 | 12/1964 | Suter | 343/5 PD X |

Primary Examiner—Malcolm F. Hubler
Attorney—Wood, Herron & Evans

[57] ABSTRACT

An intrusion alarm system includes an electromagnetic doppler sub-system and an ultrasonic doppler sub-system having outputs correlated to trigger an alarm. A threshold signal is produced when the detected ultrasonic doppler signal reaches a given level to open a gate. The electromagnetic doppler frequency signal is converted to a doppler frequency square wave which passes as a series of pulses through the opened gate. These pulses actuate an accumulator which is provided with a timed reset, which clears the accumulator at a specified time after the first pulse sets the timer, unless a prescribed minimum number of pulses have accumulated within the specified time to cause the alarm to be actuated.

8 Claims, 9 Drawing Figures

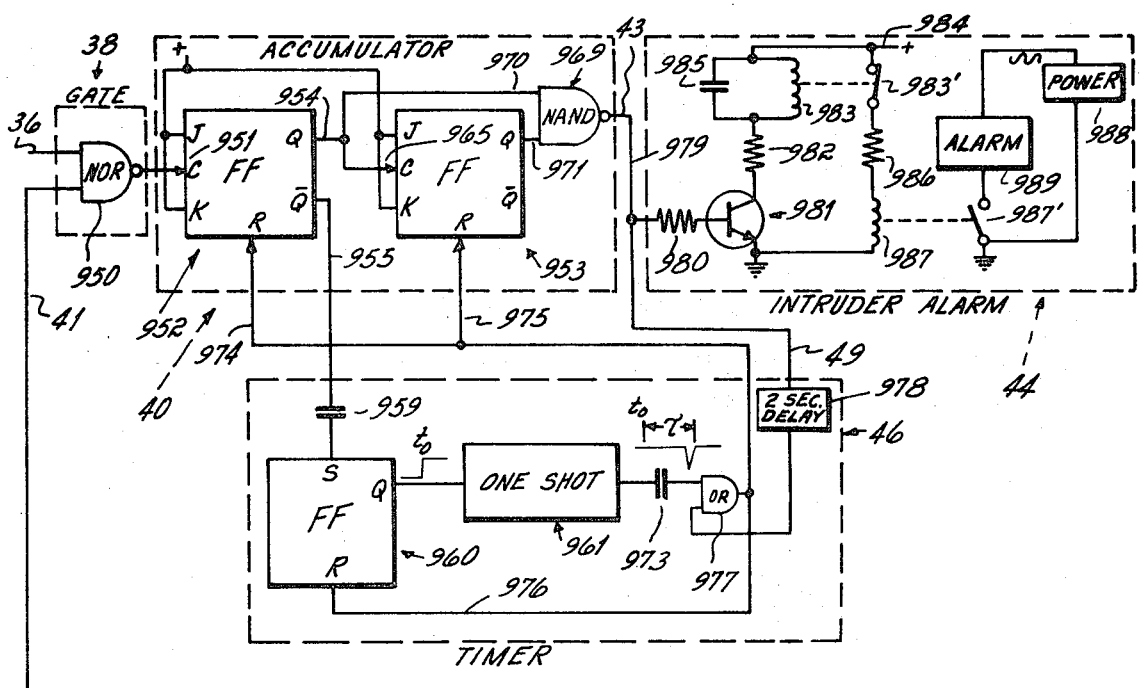
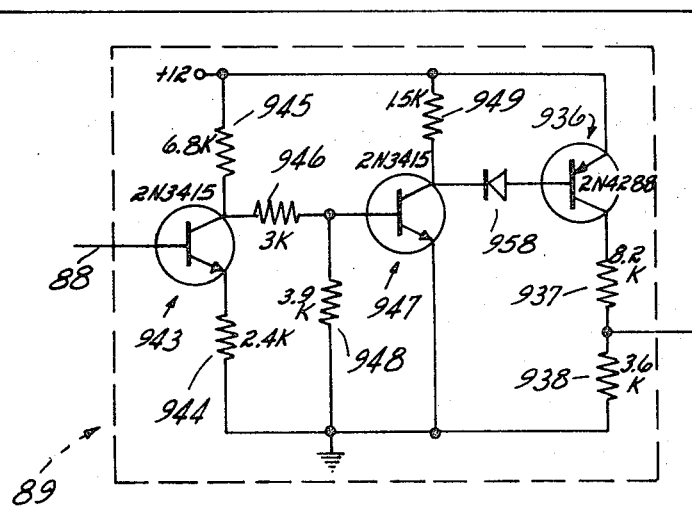
Fig. 7
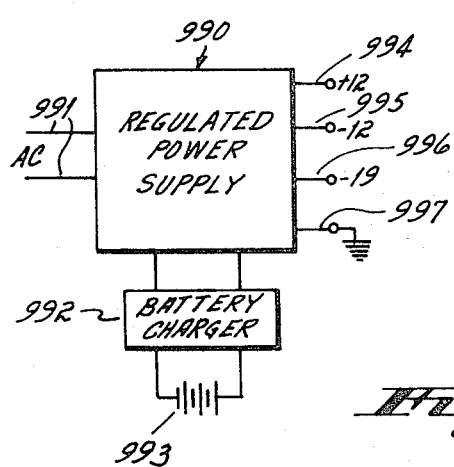
Fig. 8

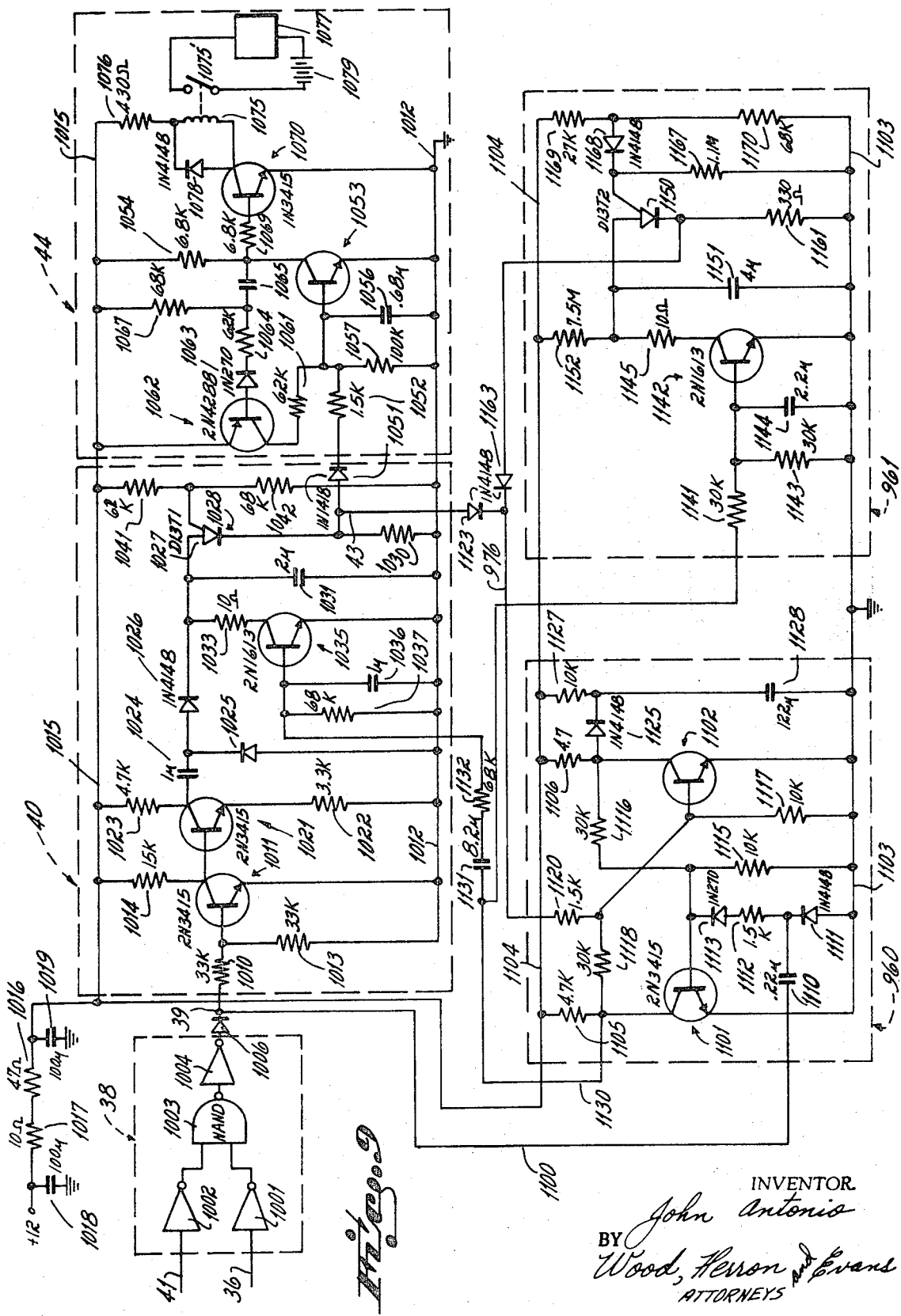

ELECTROMAGNETIC AND ULTRASONIC DOPPLER CORRELATION INTRUSION ALARM SYSTEM

The present invention relates to intrusion alarm systems which operate on the Doppler principle and, more particularly, to intrusion alarm systems which process the outputs of a plurality of alarm systems to trigger the alarm.

Intrusion alarm systems of various types have been proposed in the prior art. One class of intrusion alarm system is the space alarm system. Space alarm systems are characterized by the transmitting of energy into the space of a chamber to be protected or the space surrounding an object to be protected, and subsequently receiving the portion of the transmitted energy that is reflected by the surroundings. An alarm is triggered upon detection of a disturbance in the reflected energy caused by an intruder within the area. One type of space alarm system operates on the Doppler principle. This type of system detects a doppler frequency shift in radiation reflected from moving objects within the space. The present invention pertains to space alarm systems which make use of the doppler principle to detect intruders.

The most basic parameter in the optimization of any alarm system is attaining of the highest probability of detection of an intruder with the lowest probability of false alarm.

One approach to reduce the probability of false alarms is to combine diverse intruder detection systems to logically compare the results, and to trigger the alarm in response to the results of the comparison, such as by combining both electromagnetic and ultrasonic space alarm systems. Such correlation systems result in the reduction in the probability of false alarms to the extent that the sources of false alarm signals affect the diverse systems differently. If the results of the system are compared in a logical OR fashion, the probability of detection is increased but the probability of false alarm may be also increased. If the results are compared in a logical AND or coincidence fashion, the probability of false alarm is decreased and, with selection of proper sensitivities of the separate systems, the detection probability can be preserved.

Another approach to reduce the probability of false alarm is to process the detected signal in such a way as to distinguish between signals from intruders and signals from extraneous sources based upon the subtleties in the signal characteristics. One such approach has been to employ integration techniques in the processing of the detected signal to eliminate false alarms due to sporadic or short duration signals from extraneous sources in cases where signals from intruders can be expected to have relatively long durations.

The present invention provides, as its primary objective, a combined space alarm system which operates on the Doppler principle, and particularly one which combines electromagnetic and ultrasonic space alarm sub-systems having their outputs correlated in a novel manner to yield an alarm system of high reliability. More particularly, the present invention provides for generating a fluctuating signal of the doppler frequency from the output of one of the sub-systems, gating this signal with an output from the other sub-system in a coincidence circuit, and feeding the correlated output of the coincidence circuit to an accumulator which triggers the alarm if a prescribed number of pulses enter the accumulator within a specified period of time.

More particularly, the system of the present invention provides for the combination of frequency, time, and amplitude discrimination in the detection of intruders. Frequency discrimination is provided by the sampling of only a portion of the received signal spectra thereby triggering only in response to movements of certain velocities. Time discrimination is provided by integration of the detected signal. Pulse counting integration in the electromagnetic sub-system responds to a specified distance through which an intruder moves, while analog integration in the ultrasonic subsystem rejects certain acoustic transients. Amplitude discrimination is provided by Schmitt triggers which discriminate on a threshold basis according to the strength of the received signal. This provides a means to distinguish moving objects both by their relative sizes and their relative distances from the antennas. Thus, the present system provides a means for detecting objects based on their sizes, velocities, distances from a central point and the distances through which they travel, while rejecting certain extraneous disturbances to provide higher probability of detection and lower false alarm probability than prior art systems.

Specifically, the present invention provides an electromagnetic doppler space alarm sub-system, which detects a doppler frequency signal in the range of from 1 to 10 hz, in combination with an ultrasonic space alarm sub-system which detects a doppler signal of approximately 35 hz. The invention contemplates the generating of a threshold signal from the ultrasonic sub-system when the ultrasonic doppler signal exceeds a prescribed minimum level, and using this threshold signal to open a gate to which is connected the blocked doppler frequency output from the electromagnetic alarm sub-system. This blocked output, a square wave of the doppler frequency, passes through the gate only when the threshold signal is present, to provide a series of pulses at the RF doppler frequency which are fed to an accumulator. The accumulator is either a digital accumulator in which the pulses are counted in a register, or an analog accumulator in which the pulses progressively charge a storage circuit. The accumulator operates to trigger an alarm when the accumulator reaches a predetermined level, such as the filling of a register in the digital accumulator, or the charging of a charging circuit to a specified voltage in the analog accumulator. In conjunction with the accumulator is provided a timer which resets the accumulator at a predetermined time after the first pulse has been accumulated. If the accumulator has not been filled by the time it is reset, the alarm will not be triggered.

An advantage of the present invention is in the improved operation of the system, primarily in the reduction in the probability of false alarms, particularly false alarms due to doppler frequency signals produced by extraneous sources which affect one of the sub-systems in the same way that an intruder does, but does not so affect the other sub-system. For example, electromagnetic radiation is likely to be susceptible to interference originating from outside the area being protected such as that caused by local traffic, electrical storms, etc., which have little effect on the ultrasonic radiation. On the other hand, ultrasonic radiation is susceptible to changes in the propagating air medium, which has only a small effect on electromagnetic propagation.

Another important advantage of the present invention is that the above advantage is provided in a simplified and reliable system which utilizes a doppler output from one of the sub-systems directly to supply pulses for reliable and accurate processing by a correlation sub-system portion of the system, which integrates the pulses to eliminate short-lived disturbances. In this way a considerable amount of circuitry is avoided which would normally be required to reduce the alarm signal to a form suitable for such processing. Furthermore, such processing makes particularly efficient and direct use of signals at the doppler frequencies which carry reliable intruder information.

These and other objects and advantages of the present invention will be more readily apparent from the following detailed description of the drawings, illustrating one preferred form of a correlated intrusion alarm system according to principles of the present invention, in which:

FIG. 7 is a schematic diagram of the ultrasonic Schmitt trigger, and one embodiment of a correlation circuit of FIG. 1;

FIG. 8 is a block diagram of the power supply for the system of FIG. 1; and

FIG. 9 is a schematic diagram of an alternative embodiment of the correlation portions of the system of FIG. 1.

While component values are not required for an understanding of the invention, component values have been added in certain of the schematic diagrams to facilitate understanding of the specific circuits illustrated. Where these values are given, the resistance values are in ohms and the capacitance values are in picofarads unless otherwise noted on the drawings.

GENERAL DESCRIPTION AND OPERATION

Figure 1:
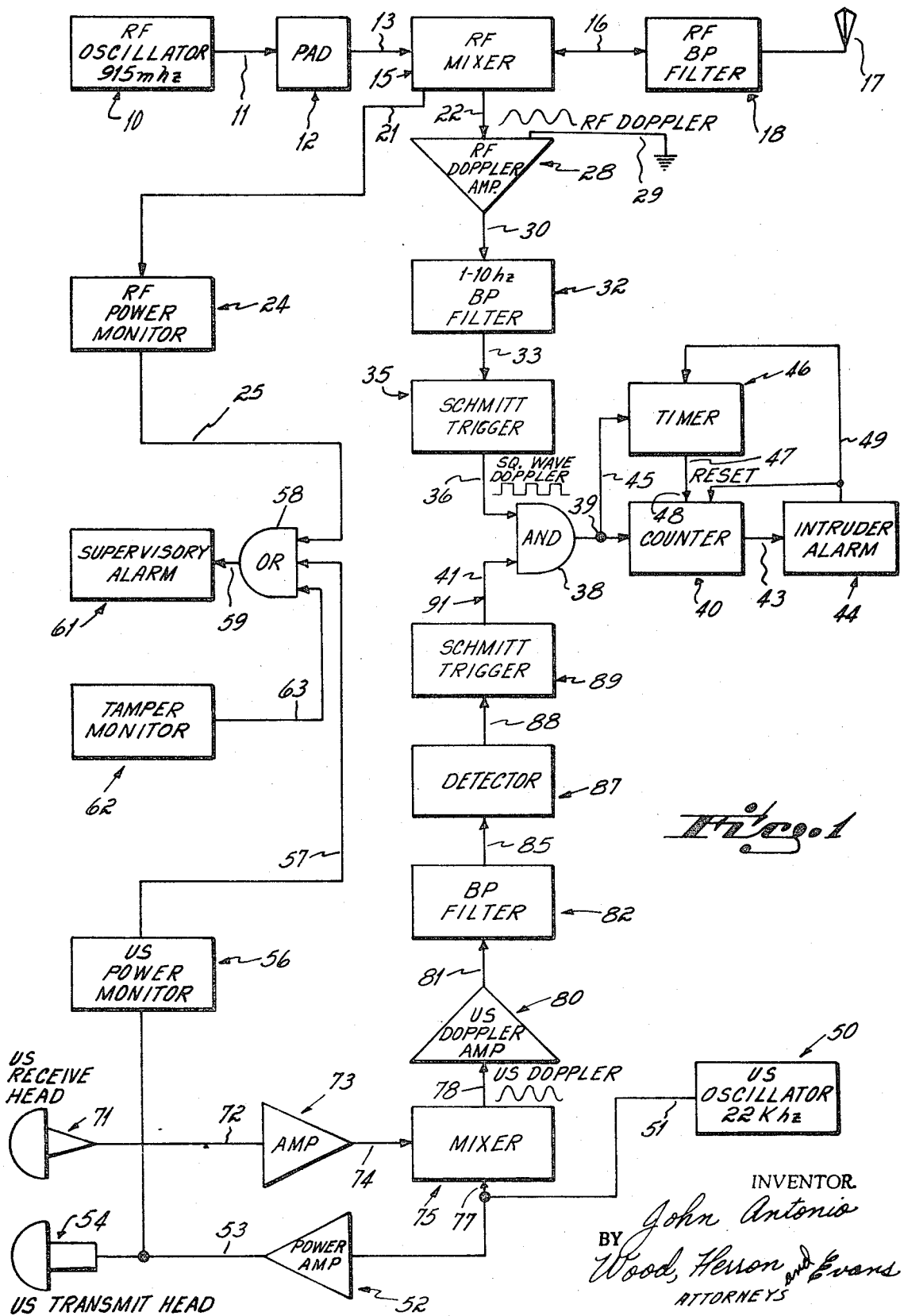
FIG. 1 is a block diagram of a radio frequency intruder alarm system employing a correlated electromagnetic and ultrasonic intrusion alarm system according to the principles of the present invention.

Referring first to FIG. 1, a radio frequency transmitter oscillator 10 is provided, having an output 11 connecting through a resistive pad 12 to the transmitter input 13 of a detector mixer 15. The RF output 16 from the mixer 15 is connected to a transmit-receive antenna 17. Connected between the antenna 17 and the mixer 15 is a band pass filter 18. The mixer 15 is provided with two outputs; a first output 21 carries a signal which indicates the presence of RF power from the transmitter, and a second output 22 carries the doppler component of the received signal, that is, a signal representing the difference between the transmitted and received RF signals.

The signal at the output 21 is a DC signal proportional to the level of the RF power from the oscillator 10. This signal is detected by a DC level sensor 24 which generates an alarm signal at its outputs 25 if the RF signal falls below a certain prescribed magnitude.

The output 22 is connected to an input of the doppler pre-amplifier 28, which has its reference inputs 29 connected to ground. The output 30 of the pre-amplifier 28 is connected to the input of a 1 to 10 hz doppler filter 32. This filter 32 defines the accepted band width of the doppler signal.

The sinusoidal doppler signal at the output 33 of the filter 32 is fed through a Schmitt trigger 35 where the signal is blocked to a square wave of the doppler frequency. This square wave appears at the output 36 of the trigger 35. The output 36 of the trigger 35 is fed to an input of the AND-gate 38. The output of the AND-gate 38 is connected to the input 39 of the pulse counter 40. A gate input 41 of the AND-gate 38 is also provided. When a signal is present at the input 41 of the AND-gate 38, the square wave doppler pulses, if present, are passed through the AND-gate 38 and are counted or accumulated in the pulse counter 40. When a specified number of pulses are accumulated in the pulse counter 40, an alarm signal at the output 43 of the pulse counter 40 is fed to the alarm 44 to trigger the alarm. The output of the AND-gate 38 is connected to the input 45 of a timer 46. The timer 46 operates as a one-shot multivibrator to generate a delayed pulse after some specified time delay from the time the first pulse from the trigger 35 is received at the input 45. The delayed pulse appearing at the output 47 of the timer 46 is fed to a reset input 48 of the pulse counter 40 to reset the counter. If the specified number of pulses have not been received by the pulse counter 40 in the prescribed time set by the timer 46, the counter will be reset and the alarm will not be triggered until such time as the specified number of pulses pass through the gate 38 within the specified time interval. In this way, extraneous pulses and small motions detected, but which are not likely to be caused by an intruder, are rejected, and the probability of false alarms due to such causes is reduced. The alarm 44 is provided with a time delayed output 49 which is effective to reset the counter 40 and timer 46. The delay of this output is, for example, 2 seconds, which allows sufficient ON-time for the alarm before resetting the system.

To provide further reduction in the probability of false alarms, the gate input 41 of the AND-gate 38 is connected to an independent alarm system which responds in a given way to the presence of an intruder. This system is an ultrasonic alarm system which, like the RF system above described, responds to the presence of an intruder, but which, because of the difference between ultrasonic and radio frequency radiation, will respond in different ways and to different types of extraneous disturbances. The signal from this secondary system at the input 41 of the gate 38 will enable the gate to permit passage of the discrete pulses through the trigger 35. The concept provides for independent RF and ultrasonic intruder detection systems in which the outputs of the two systems are correlated in such a manner that a constant threshold signal from the ultrasonic system at gate input 41 enables the passage of doppler frequency pulses at the input 36, and then the counting of these pulses.

More particularly, an ultrasonic doppler intruder detection system is illustrated in FIG. 1. This system resembles the RF system, with certain differences.

More specifically, an ultrasonic oscillator 50 is provided for generating an electrical signal, in the preferred form of the present invention, at a frequency of 22 Khz, at the output 51 of the oscillator 50. This output 51 is connected through a power amplifier 52 to a power output line 53 which is connected to an ultrasonic transducer 54, which includes a piezoelectric crystal. Also connected to the output line 53 is an ultrasonic power monitor circuit 56 which generates a signal when power is absent from the line 53. The signal from the monitor 56 is generated on line 57 and sent to an OR-gate 58. The output 59 of the OR-gate 58 is connected to a supervisory alarm 61 which is triggered by the OR-gate 58 whenever the power fails in any of the alarm system, or whenever any other abnormality occurs, such as might be provided by a tamper alarm circuit 62, which has an output 63 also connected to an input of the OR-gate 58. The OR-gate 58 has an input connected to the output line 25 of the RF power monitor 24.

The energy transmitted from the transmit head 54 is reflected from objects within the room being surveyed. The signal, bearing the doppler frequency shift caused by the movement of objects from which the signal reflects, is received by the receiver head 71. The receiver head is connected to the input 72 of a receiver amplifier 73 which amplifies the received signal from the head 71 and feeds it to the input 74 of an ultrasonic frequency mixer 75. The mixer 75 has a second input 77 connected to the oscillator output 51. An output 78 of the mixer 75 contains a doppler frequency sine wave which is the doppler component of the received signal. The signal is fed through an ultrasonic doppler frequency amplifier 80 which has an output 81 connected through an ultrasonic band pass filter 82. The output 85 of the band pass filter 82 connects the input of a detector 87 which generates a signal proportional to the magnitude of the doppler signal within the band of the filter 82 at the output 88 of the detector 87. This output 88 connects to the input of a Schmitt trigger 89. When the magnitude of the doppler signal from the ultrasonic system contains a predetermined threshold magnitude, the Schmitt trigger 89 generates an output signal of a constant voltage at its output 91 which connects to the gate input 41 of the AND-gate 38. This enables the AND-gate 38, and permits the passage of the square wave doppler frequency pulses from the RF section as output on line 36.

It can be seen that only when both the ultrasonic alarm portion of the system and the radio frequency alarm portion of the system have been triggered will any signal pass through the AND-gate 38 to its output 45. Thus, the probability of false alarms of the correlated system is improved in that it now becomes equal to the product of the probabilities of false alarm of the two systems taken individually.

The reliability of the system is further improved by the specific correlation system employed in the present invention which provides for the constant value alarm signal at the gate input 41 of the AND-gate 38 to enable the gate 38 to pass a square wave alarm signal pulse from the RF portion of the system. The alarm condition which requires the counting of a prescribed number of these doppler frequency pulses in a prescribed time eliminates probabilities that false alarms will occur by extraneous disturbances of extremely short duration. By utilizing the doppler frequency and transforming it to a square wave function to energize the counter 40, a considerable amount of circuitry is eliminated. This is provided by treating the sine wave doppler signal, which is generated at a frequency which is a function of the transmitted frequency and the object velocity in the direction of the propagating radiation, to transform it into a doppler frequency series of pulses which energize the counter. In this manner, a simple and reliable counter can be used, such as a register type counter or an integrator, which can utilize the constant amplitude square wave pulses directly in testing for the alarm condition.

DETAILED DESCRIPTION OF CIRCUIT

Figure 2:
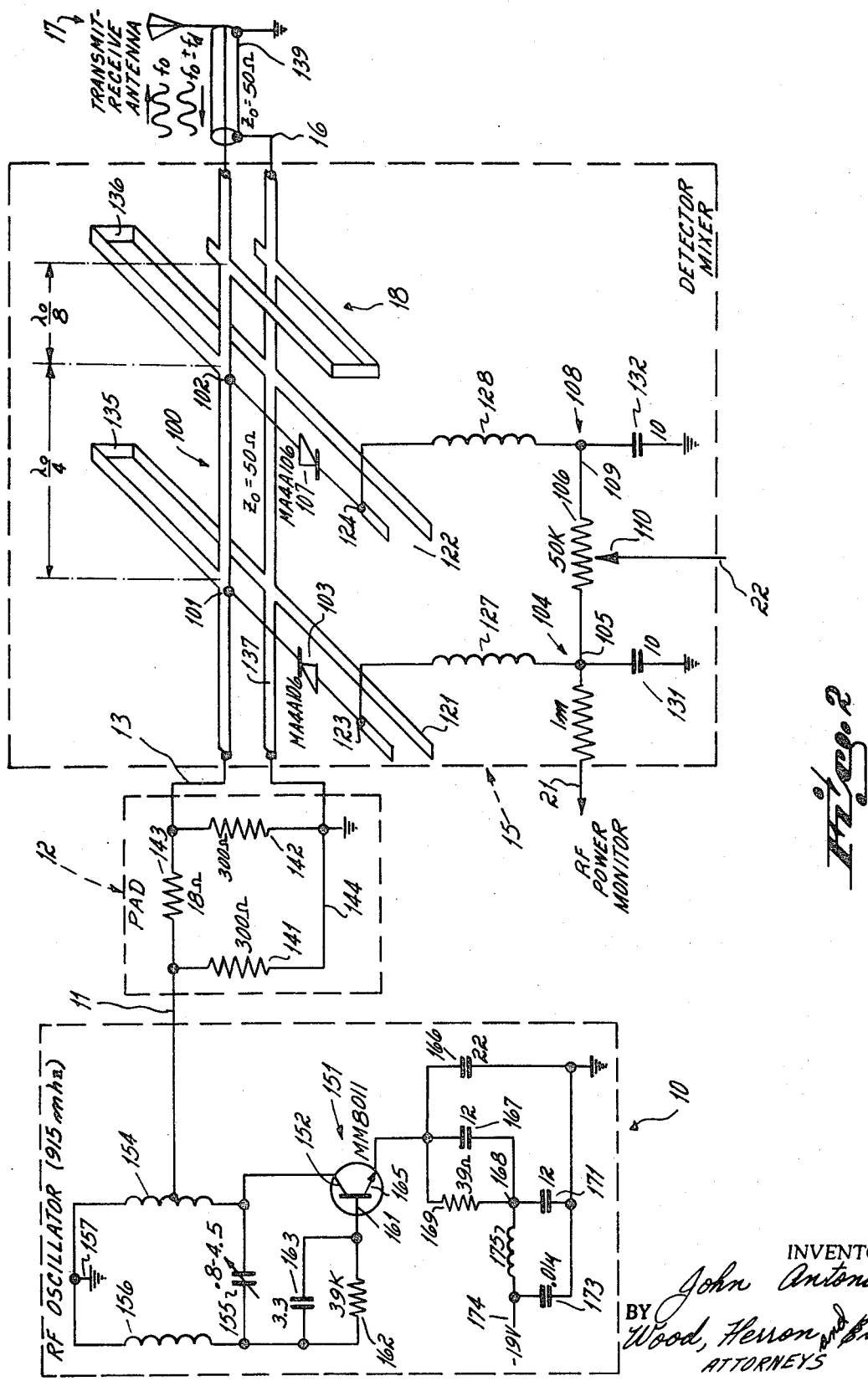
FIG. 2 is a schematic diagram partially in perspective illustrating particularly the radio frequency portions of the system of FIG. 1.

The detector mixer 15 is described fully in the copending application of Alex Y. Lee and David N. Gershberg for "Intrusion Alarm System with Differential Doppler Detection" filed on even date herewith. Referring to FIG. 2, the mixer 15 includes a transmission line wave guide 100 connected between the pad 12 and the antenna 17. The transmission line 100 has preferably a constant characteristic impedance throughout its length, which is equal to the impedance of the antenna 17 and the reverse impedance of the pad 12. In the preferred embodiment, the characteristic impedance is 50 ohms. The line 100 is therefore terminated at each end in a matched load of 50 ohms. The RF power from the oscillator 10 is at a frequency of 915 mhz for the preferred intruder detection system. The transmission line 100 is provided with two contact points 101 and 102 spaced one-quarter wavelength apart along the transmission line 100. Connected to each of these points are a pair of high impedance or lightly coupled minimum energy detectors. A first detector includes a diode 103 having its cathode connected to the point 101 on the transmission line 100, and its anode connected through a low pass filter 104 to one end 105 of a potentiometer 106. The terminal 105 is also connected to the output 21 of the mixer 15. Similarly, a diode 107 has its anode connected to the point 102 of the transmission line 100 and its cathode connected through a low pass filter 108 to the other end 109 of the potentiometer 106.

The wiper 110 of the potentiometer 106 is connected to the doppler output 22 of the mixer 15. The wiper 110 is adjusted on the potentiometer 106 to an impedance point equidistant between the end points 105 and 109. In this manner, signals equal in magnitude but opposite in sign applied to each of the points 105 and 109, respectively, will result in a zero output signal at the terminal 22. Because the diodes 103 and 107 are reverse connected to the transmission line 100, a continuous wave RF signal on the line 100 will result in envelope detection by the diodes 103 and 107 of signals which are equal in magnitude but opposite in polarity, thus yielding a zero level signal at the output 22. When a received signal is present on the transmission line traveling in the opposite direction of the transmitted signal, a standing wave will appear on the transmission line 100 which has its maximum and minimum points at different points which are dependent upon the relative phase of the transmitted and received signals. When viewing the envelope of the resultant wave on the transmission line 100, at the two points 101 and 102, which are spaced a quarter wave apart, it will be found that, for a given phase relationship of the wave, the transmitted and reflected components will add as one of the points in a 180° phase relationship with respect to the manner in which they add at the other of the points. For example, a wave having a given phase relationship between components at point 101 will appear at point 102 with the transmitted signal lagging by a quarter of a wave to the spacing of the points in the direction of the transmitted signal on the transmission line 100, and the received wave will be leading by a quarter of a wave length at the point 102 due to the opposite direction of the received signal on the transmission line 100. Thus the signals will add at one point and subtract at the other. As long as there is no relative phase change in the received wave with respect to the transmitted wave, this standing wave will be stationary on the line 100. This DC signal will not pass through the amplifier-filter combination 28 and 32. But if there is any phase rate of change of the received wave with respect to the transmitted wave due, for example, to a doppler shift in the transmitted wave as is reflected from a moving object, a standing wave will move along the line at the doppler frequency. This wave will pass through the diodes 103 and 107 in the opposite senses and the low-pass filters 104 and 108 to be applied to the opposite end of the potentiometer 106, to cause the doppler frequency signal to appear at the wiper 110 of the potentiometer 106 and at the output 22 of the detector mixer 15.

Connected to the transmission line at a point one-eighth of a wave length from the point 102 toward the antenna 17 is a band pass filter 18. This filter is tuned to the frequency of the transmitter wave, which is the same frequency which controls the spacing between the points 101 and 102 and between the point 102 and the filter 18. Because the transmission line is matched to the antenna at this tuned frequency, reflections of the transmitter from the filter 18 are minimized. However, if the oscillator 10 is mis-tuned to any degree, the transmitted wave will reflect back along the transmission line due to the sharply tuned filter 18, and a standing wave will appear on line 100 which will increase the voltage at one of the points 101 or 102 and decrease the voltage at the other of the points 101 or 102. This results in a DC signal to appear at the contact 110 of the potentiometer 106. This potential output is nulled to facilitate tuning of the oscillator 10.

The transmission line 100 is a microstrip transmission line having a characteristic impedance of 50 ohms. The transmission line 100 is made up of an etched double clad printed circuit board of the commercially available teflon dielectric type. The plating on one side of the board makes up a ground conductor 137, and the plating on the other side of the board makes up the other conductor of the transmission line 100. The diodes 103 and 107 are a matched pair of diodes selected for their similarity in characteristics. The diodes are each connected in series with open circuited stubs 121 and 122. At the junctures 123 and 124 between the diodes 103 and 107, respectively, and the open circuited stubs are connected low pass filters 105 and 104. The low pass filters consist of inductances 127 and 128, respectively connected between the points 123 and 124 and the opposite ends 105 and 109 of the potentiometer 106. A pair of capacitors 131 and 132, respectively connected between the points 105 and 109 and ground, further make up the filters 104 and 108, respectively.

At the points 101 and 102 of the transmission line, the connection of the diodes 103 and 107 present relatively high impedances to the transmission line 100. However, even though these impedances are relatively high with respect to the characteristic impedance of the line 100, a slight reactive and resistive mis-match effect will occur, and to compensate for the reactive part, the shorted stubs 135 and 136 are respectively shunted across the respective points 101 and 102 of the transmission line. Because the diodes 103 and 107 appear slightly capacitive across the transmission line, the stubs are selected of such a length that they will appear inductive to present an impedance equal in magnitude but opposite in sign to that of the diodes at the points 101 and 102, thereby cancelling the effect of the diode detector reactance on the transmission line 100.

The band pass filter 18 is also a shorted stub resonator which is selected to be of such a length as to be resonant at the selected center of frequency of the oscillator 10. This filter 18 will appear as a very high shunt impedance to signals at the center of frequency. Connected between the output 11 and the output 13 of the pad 12 is an 18 ohm resistor 143. The pad matches the transmission line for incoming signals which improves the detector sensitivity for intruder caused signals. The improved match also improves the detector balance, and therefore the rejection of interfering signals. These improvements greatly reduce false alarms.

The output 16 of the mixer 15 is connected through a 50 ohm transmission line to the transmit-receive antenna which is matched to the 50 ohm line. The input 13 of the mixer 15 is connected across a resistive pad 12. The impedance of the pad 12 to received signals moving toward the transmitter 10 is 50 ohms, and is matched to the impedance of the transmission line 100. The pad 12 includes a resistor 141 of 300 ohms connected through the input 11 of the pad 12 and a ground line 144, and a 300 ohm resistor 142 connected through the output 13 of the pad 12 and the ground line 144. Connected between the output 11 and the output 13 of the pad 12 is an 18 ohm resistor 143.

The oscillator 10 includes an NPN transistor 151 which has its collector 152 connected through an inductor 154 and ground 157. The collector 152 is also connected through a variable tuning capacitor 155 and a second inductor 156 to ground 157. The inductors 154 and 156 are parallel line inductors etched into the same printed circuit board as the transmission line 100 of the mixer 15. It has been found that inductors constructed in this manner exhibit excellent temperature stability at the preferred frequency of 915 mhz. It is noted that the ground point 157 in the diagram of FIG. 2 represents an extension of the ground conductors 137 of the transmission line 100 and the ground conductors 144 of the pad 12. Furthermore, the ground of the transmission line 139 which connects the mixer 15 to the antenna 17 is an extension of this ground line.

The base 161 of the transistor 151 is connected through a resistor 162 to the junction of the capacitor 155 and the inductor 156. Connected across a resistor 162 is a capacitor 163. The emitter 165 of the transistor 151 is connected to ground through the capacitor 166. The emitter 165 is also connected through a capacitor 167 to a node 168. Connected across the capacitor 167 is a resistor 169. Connected between the node 168 and ground is a capacitor 171. The node 168 is connected to a −19 volt regulated output of a power supply through a low pass filter consisting of a capacitor 173 connected between the power supply output 174 and ground, and an inductor 175 connected between the node 168 and the power supply output 174.

Figure 3:
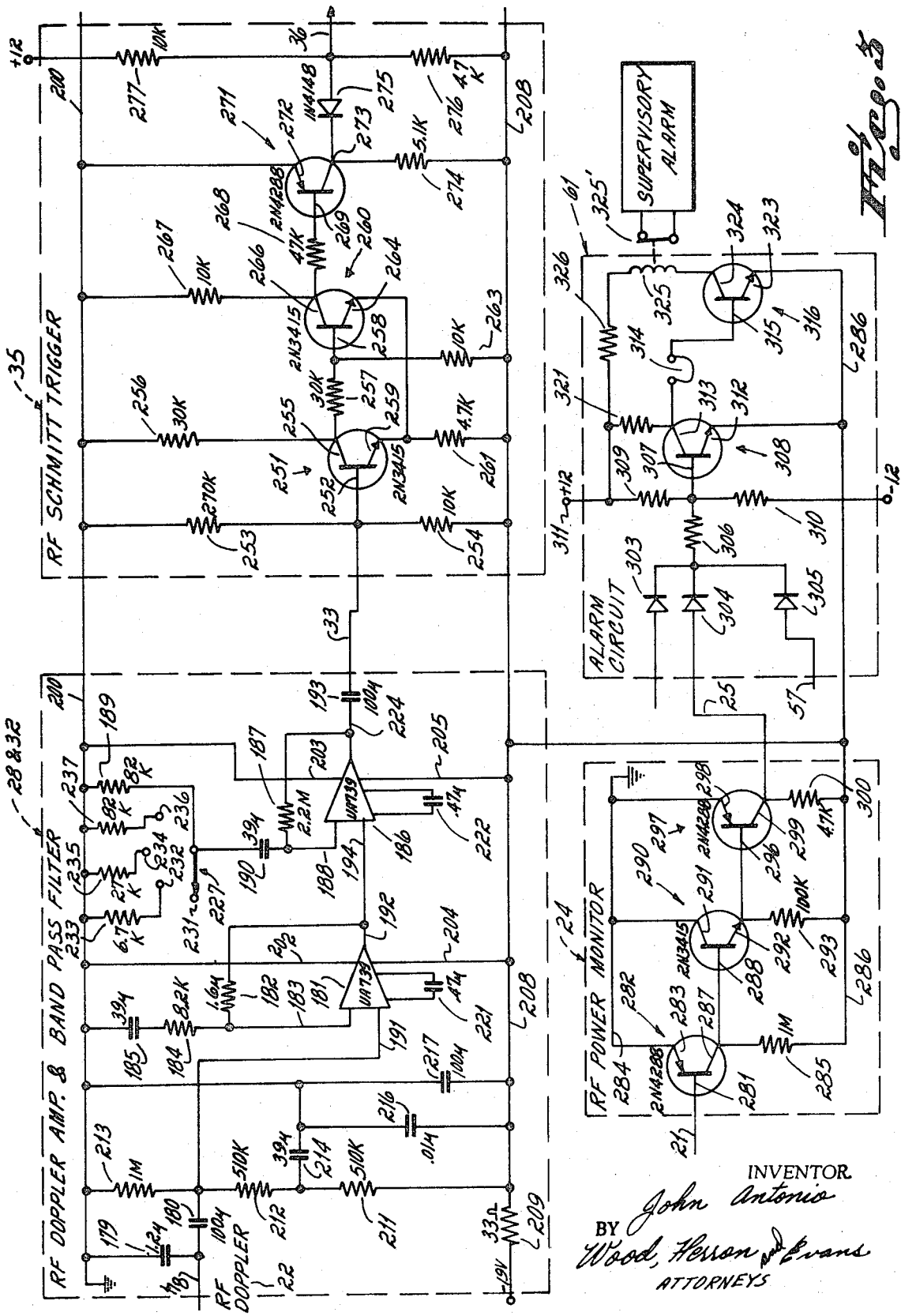
FIG. 3 is a schematic diagram of the detailed circuitry of the RF doppler preamplifier, band pass filter, Schmitt trigger and power monitor circuits of FIG. 1.

Referring to FIG. 3, the left most box outlined by dotted lines includes the RF doppler amplifier 28 and the band pass filter 32. The input to this box is the input to the amplifier and the output of this box is the output of the filter. Specifically, the RF doppler amplifier 28 has an input 178 connected to the output 22 of the mixer 15. Connected between the input 178 and ground is a capacitor 179. A capacitor 180 is connected between the input 178 and an input 191 of an operational amplifier 181. The operational amplifiers used throughout the present circuit are Fairchild UA-739's. The amplifier 181 has an output 192 connected to an input 194 of a second operational amplifier 186. The output 192 of amplifier 181 is connected through a feedback resistor 182 to an input 183 of the amplifier 181. The input 183 is connected through a series circuit consisting of a resistor 184 and a capacitor 185 to a ground line 200. The amplifiers 181 and 186 have power leads 202 and 203, respectively, connected to the ground line 200, and 204 and 205, respectively, connected to a negative voltage line 208. The negative voltage line 208 is connected through a resistor 209 to a regulated negative −19 volt supply from a power supply. A voltage divider is connected between a ground line 200 and the negative line 208. This voltage divider includes a resistor 211, a resistor 212, and a resistor 213 connected in series in that respective order between the negative line 208 and the ground line 200. A capacitor 214 is connected between the junction of resistors 211 and 212 and the ground line 200, and the junction of the resistors 212 and 213 is connected to the input 191 of the amplifier 181. A pair of filter capacitors 216 and 217 are connected across the lines 200 and 208. A capacitor 211 is connected across terminals of the amplifier 181 and similarly capacitor 222 is connected across terminals of the amplifier 186. The amplifier 186 is provided with an output 224 which is connected through a feedback resistor 187 to an input 188 of the amplifier 186. The amplifier input 188 is connected through a series circuit consisting of capacitor 190, and resistor 189 to the ground line 200. A switch 227 is provided having a common contact connected to the junction of resistors 189 and capacitor 190. This switch 227 is effective to connect alternative resistances across the resistor 189. To this end the switch 227 is provided with an open contact 231, a contact 232 connected through resistor 233, a contact 234 connected through a resistor 235, and a contact 236 connected to a resistor 237, all in turn connected to ground. The output 33 of the bandpass filter 32 is connected through a capacitor 193 to the output 224 of the amplifier 186. The output of this box 28 and 32 is designated 33 and is the input to the Schmitt trigger module 35.

A Schmitt trigger 35 includes an NPN transistor 251 having a base 252 connected through a resistor 253 to the ground line 200, and through a resistor 254 to the negative voltage line 208. The base 252 is also connected to the output 33 of the amplifier and filter unit 28 and 32. The collector 255 of the transistor 251 is connected through a resistor 256 to the ground line 200, and through a resistor 257 to the base 258 of an NPN transistor 260. The emitter 259 of the transistor 251 is connected through a resistor 261 to the negative voltage line 208. The base 258 of the transistor 260 is connected through a resistor 263 to the negative voltage line 208. The emitter of transistor 251 is connected to the emitter 264 of the transistor 260. The collector 266 of the transistor 260 is connected through a resistor 267 to the ground line 200 and through a resistor 268 to the base 269 of a PNP transistor 271. The emitter 272 of the transistor 271 is connected to the ground line 200 and the collector 273 of the transistor 271 is connected through a resistor 274 to the negative voltage line 208, and to the cathode of the diode 275. The anode of the diode 275 is connected through a resistor 276 to the negative voltage line 208 and through a resistor 277 to a regulated positive 12 voltage output from a power supply. The output 36 of the Schmitt trigger 35 is connected to the anode of the diode 275.

Also illustrated in FIG. 3 is the RF power monitor circuit 24 which has its input 21 from mixer 15 connected to the base 281 of a PNP transistor 282, which has its emitter 283 connected to a ground line 284, and its collector connected through a resistor 285 to a negative voltage line 286, which is connected to the negative voltage line 208 of the amplifier and filter 28 and 32. The collector 287 of the transistor 282 is connected to the base 288 of an NPN transistor 290. The collector 291 of the transistor 290 is connected to the ground line 284, and the emitter 292 of the transistor 290 is connected through a resistor 293 to the negative voltage line 286, and to the base 296 of a PNP transistor 297. The emitter 298 of the transistor 297 is connected to the ground line 284 and the collector 299 of the transistor 297 is connected through a resistor 300 to the negative voltage line 286. The output 25 of the RF power monitor circuit 24 is also connected to the collector 299 of the transistor 297.

The supervisory alarm circuit 61 includes the OR-gate 58 having a plurality of inputs illustrated for simplicity as three in number in the drawing. These inputs include the anodes of diodes 303, 304, and 305. The anode of diode 304 is connected to the output 25 of the RF power monitor circuit 24. The diode 305 has its anode connected to the output 57 of the ultrasonic power monitor 56, as will be explained below. The diode 303 is provided as an additional input to monitor some other condition. The cathodes of the diodes 303 through 305 are connected through a resistor 306 to the base 307 of an NPN transistor 308. The base 307 of the transistor 308 is connected through a resistor 309 to a regulated +12 volt power output terminal 311 and through a resistor 310 to a regulated negative DC output from a power supply. The emitter 312 of the transistor 308 is connected through the negative voltage 286 and the collector 313 is connected through a tamper line 314 to the base 315 of an NPN transistor 316. The tamper line 314 indicates a normally closed circuit condition which, upon tampering, may be broken. This may alternatively include a normally closed limit switch. The collector 313 of the transistor 308 is connected through a resistor 321 to the positive terminal 311. The emitter 323 of the transistor 316 is connected to the negative voltage 286 and the collector 324 of the transistor 316 is connected through a relay winding 325 and a resistor 326 to the positive terminal 311. The relay winding 325 is normally energized. If a signal appears at the gate 58 to cause the transistor 308 to conduct and thereby ground the base 315 of the transistor 316, or if the tamper conductor 314 is broken, breaking the current supply to the base 315 of the transistor 316, the transistor 316 will cease to conduct, and the relay winding 325 will switch its contact 325 to an opposite state which will energize an alarm. The tamper lines 314 take the place of the tamper monitor 62 of FIG. 1, which is illustrated there to logically perform the same function.

Figure 4:
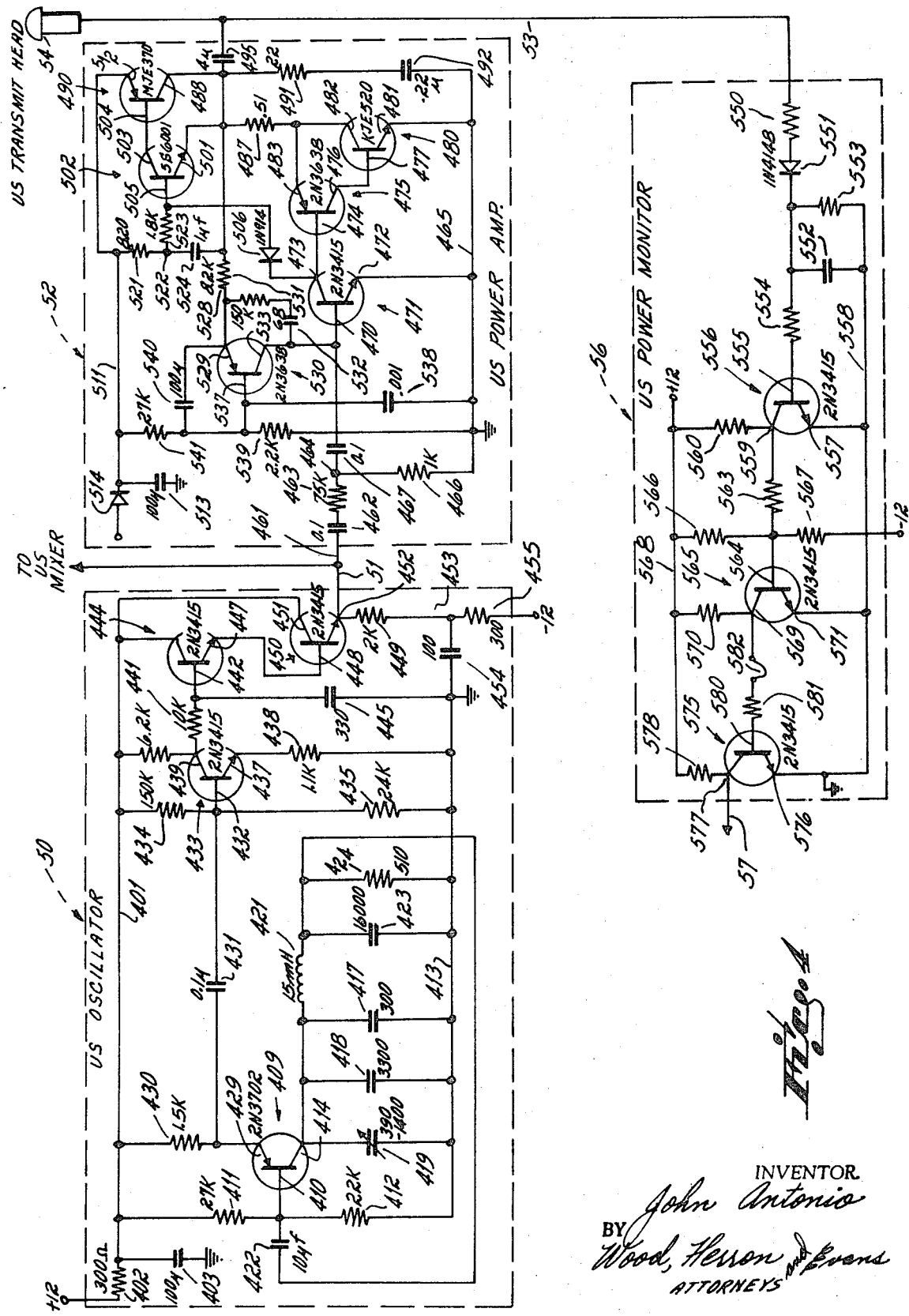
FIG. 4 is a schematic diagram of the detailed circuitry of the ultrasonic oscillator, power amplifier, and power monitor of FIG. 1.
Figure 5:
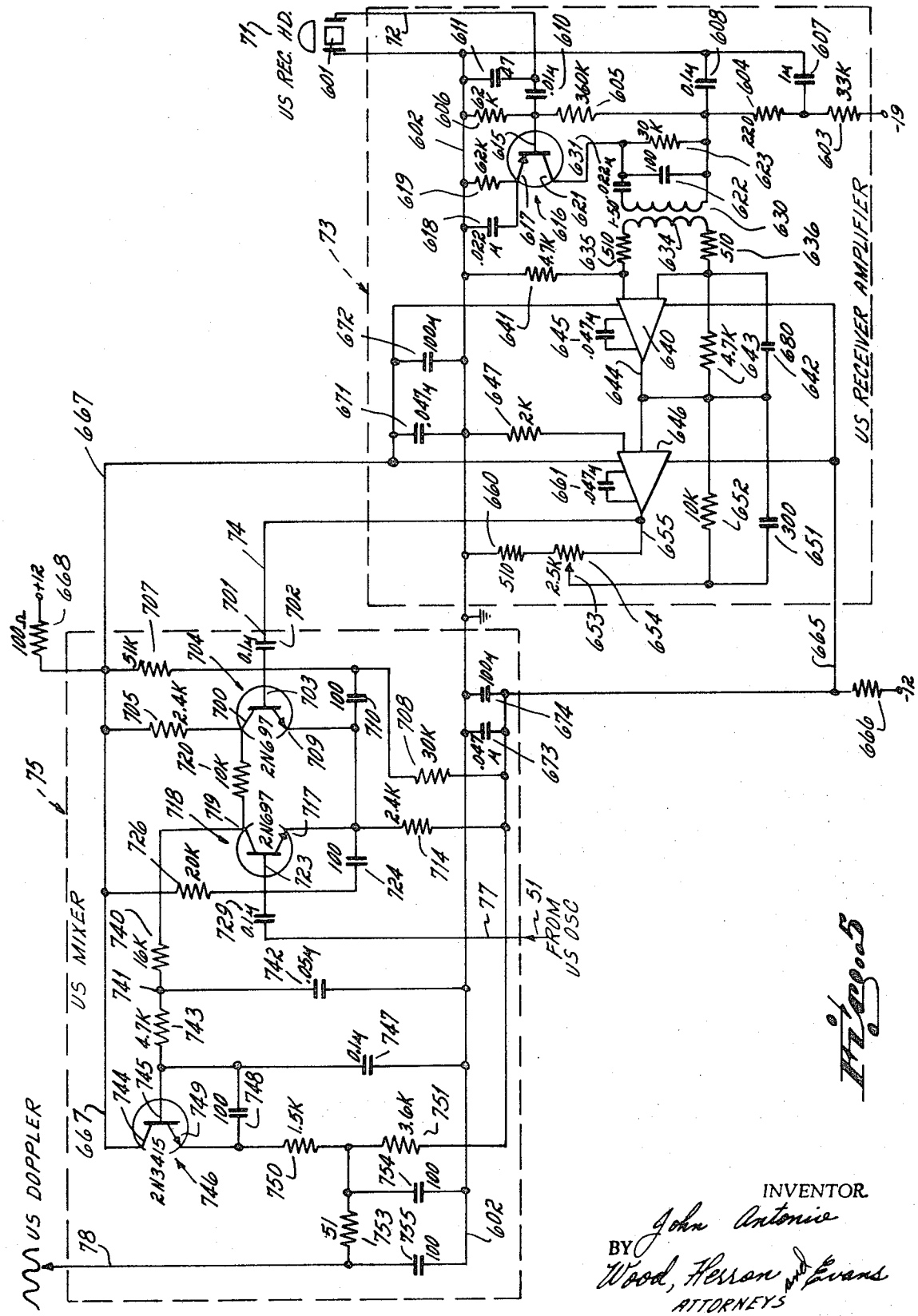
FIG. 5 is a schematic diagram of the detailed circuitry of the ultrasonic receiver/amplifier and the ultrasonic mixer of FIG. 1.
Figure 6:
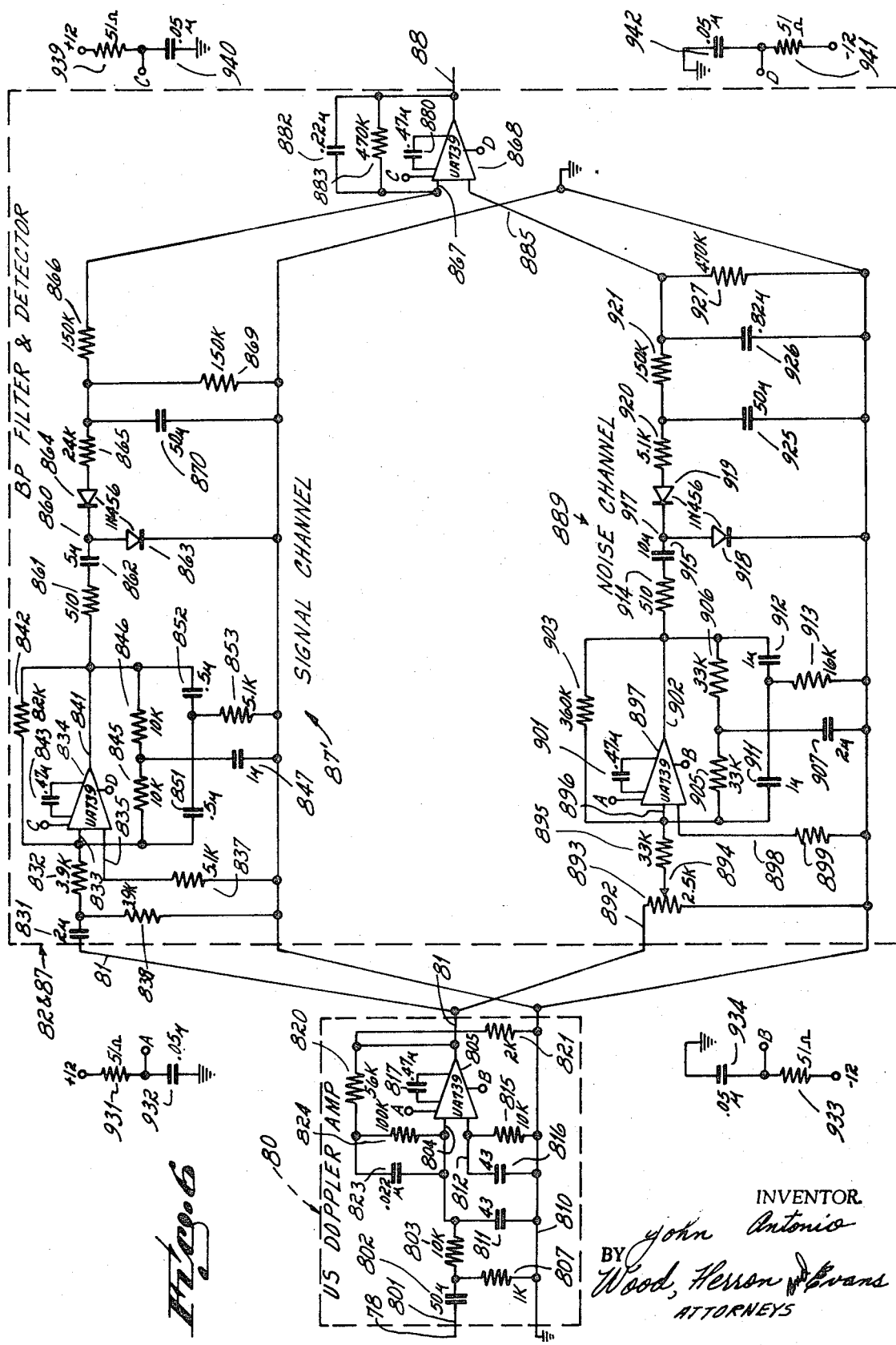
FIG. 6 is a schematic diagram of the ultrasonic doppler amplifier and band pass filter and detector circuit of FIG. 1.

The ultrasonic portion of the intrusion alarm system is described in detail in FIGS. 4-6.

Referring first to FIG. 4, the ultrasonic transmitter portion of the ultrasonic alarm sub-system includes the ultrasonic oscillator 50 which has its output 51 connecting to the input of the ultrasonic power amplifier 52, which has its output 53 connecting both to the ultrasonic transmit head 54 and to the input of the ultrasonic power monitor 56. The output 57 of the ultrasonic power amplifier 56 connects to the anode of diode 305 of the OR-gate 58 of the supervisory alarm sub-system of FIG. 3.

Considering first the ultrasonic oscillator 50, a positive voltage line 401 is connected through a resistor 402 to the positive 12 volt output of the regulator power supply. The line 401 is also connected through a capacitor 403 to ground. A PNP transistor 409 is provided, having a base 410 connected through a resistor 411 to the positive line 401, and through a resistor 412 to a ground line 413. The collector 416 of the transistor 409 is connected to the ground line 413 through three parallel connected capacitors, including fixed capacitors 417 and 418 and a variable capacitor 419 which is provided to tune the oscillator 50. The collector 416 of the transistor 409 is also connected through an inductor 421 and a capacitor 422 to the base 410 of the transistor 409. The junction of the inductor 421 and the capacitor 422 is connected to ground through a parallel network including a capacitor 423 and a resistor 424. The emitter 429 of the transistor 409 is connected through a resistor 430 to the positive line 401, and through a capacitor 431 to the base 432 of an NPN transistor 433. The base 432 of the transistor 433 is connected through a resistor 434 to the positive line 401 and through a resistor 435 to the ground line 413. The emitter 437 of the transistor 433 is connected through a resistor 438 to the ground line 413. The collector 439 of the transistor 433 is connected through a resistor 440 to the positive line 401, and through a capacitor 431 to the base 432 of an NPN transistor 433. The base 432 of the transistor 433 is connected through a resistor 434 to the positive line 401 and through a resistor 435 to the ground line 413. The emitter 437 of the transistor 433 is connected to a resistor 438 to the ground line 413. The collector 439 of the transistor 433 is connected through a resistor 440 to the positive line 401 and through a resistor 441 to the base 442 of an NPN transistor 444. The base 442 of the transistor 444 is connected through a capacitor 445 to the ground line 413. The emitter 447 of the transistor 444 is connected to the base 448 of an NPN transistor 450. The transistor 450 has its collector 451 connected to the positive voltage line 401 and its emitter 452 connected to the output 51 of the oscillator 50 and through a resistor 449 to a negative voltage line 453. The negative voltage line 453 is connected to ground through a capacitor 454 and to a regulated negative 12 voltage output of a power supply through a resistor 455.

The ultrasonic power amplifier 52 includes an input 461 connected to the output 51 of the ultrasonic oscillator 50. The input 461 is connected to a capacitor 462 connected in series with a resistor 463 to a node 464. The node 464 is connected to a ground line 465 through a resistor 466 and through a capacitor 467 to the base 470 of an NPN transistor 471. The transistor 471 has its emitter 472 connected to the ground line 465. The collector 473 of the transistor 471 is connected to the base 474 of a PNP transistor 475 which in turn has its collector 475 connected to the base 477 of an NPN power transistor 480. The emitter 481 of transistor 480 is connected to the ground line 465. The collector 482 of the transistor 480 is connected to the emitter 483 of the transistor 475 and through a resistor 487 to the collector 488 of a second power transistor, the PNP transistor 490. The collector 488 of the transistor 490 is connected through a series circuit consisting of a resistor 491 and a capacitor 492 to the ground line 465. The collector 488 of transistor 490 is also connected through an output capacitor 495 to the power amplifier output 53. The collector 488 of transistor 490 is further connected to the emitter 501 of an NPN transistor 502, which has its collector 503 connected to the base 504 of transistor 490. The base 505 of transistor 502 is connected to the collector 473 of the transistor 471. A positive voltage line 511 is provided which is connected to the emitter 512 of transistor 490 and through a capacitor 513 to ground. The line 511 is also connected to the cathode of the diode 514 which has its anode connected to the positive 12 volt regulated power supply. The line 511 is connected through a resistor 521 to a node 522 which is connected in turn through a resistor 523 to the base 505 of the transistor 502. The node 522 is connected through a capacitor 524 to the emitter 501 of the transistor 502, which is in turn connected through a resistor 528 to the emitter 529 of a PNP transistor 530. The emitter 529 of the transistor 530 is also connected through a series circuit consisting of a resistor 531 and a capacitor 532 to the collector 533 of the transistor 530. The base 537 of the transistor 530 is connected through a capacitor 538 to the ground line 465 and through a resistor 539 also to the ground line 465. A capacitor 540 is connected between the base 537 of the transistor 530 and the emitter 529 of transistor 530. The base 537 of transistor 530 is also connected through a resistor 541 to the positive line 511.

The ultrasonic power monitor 56 is an envelope detector circuit which includes an input circuit consisting of a resistor 550 connected between the output 53 of the amplifier 52 and the anode of a diode 551. The cathode of the diode 551 is connected through the parallel connected capacitor 552 and resistor 554, and through another resistor 554 to the base 555 of an NPN transistor 556 which has its emitter 557 connected to the ground line 558. The collector 559 of the transistor 556 is connected through a resistor 560 to the positive 12 volt line 568 which is the output of the power supply, and through a resistor 563 to the base 564 of an NPN transistor 565. The collector 569 of transistor 565 is connected through a resistor 570 to the positive line 568, and the emitter 571 of the transistor 565 is connected to the ground line 558. An NPN transistor 575 is provided, having its emitter 576 connected to the ground line 558 and its collector 577 connected through a resistor 578 to the positive voltage line 568. The base 580 of the transistor 575 is connected through a resistor 581 and a tamper line conductor 582 to the collector 569 of transistor 565. The base 564 of transistor 565 is connected through a resistor 566 to the positive line 568 and through a resistor 567 to the negative 12 volt output of the power supply. The output 57 of the ultrasonic power monitor is connected to the collector 577 of transistor 575. The output 57 connects externally, as indicated above, to the anode of the diode 305 of the OR-gate 58 of the supervisory alarm 61 in FIG. 3.

Referring now to FIG. 5, the ultrasonic receiver is illustrated in detail. The ultrasonic receive head 71 includes a piezoelectric crystal 601 connected between the input 72 of the receiver amplifier 73 and a ground line 602. A voltage divider is provided which includes four series resistors, 603, 604, 605, and 606, connected respectively between a minus 19 volt output from the power supply and the ground line 602. The juncture of resistors 603 and 604 is connected to ground through a capacitor 607, while the juncture of resistors 604 and 605 is connected to ground through a capacitor 608. The juncture of resistors 605 and 606 is connected to the receiver input 72 to a capacitor 610. The input line 72 is connected to ground through a capacitor 611. The juncture of resistors 605 and 606 is also connected to the base 615 of a PNP transistor 616 which has its emitter 617 connected to ground through a parallel circuit consisting of a capacitor 618 and a resistor 619. The collector 621 of the transistor 616 is connected through a parallel circuit consisting of the capacitor 622 and a resistor 623 to the juncture of resistors 604 and 605. This juncture is also connected to one end of a primary transformer winding 630, which is connected at its other end through a capacitor 631 to the collector 621 of the transistor 616. A secondary transformer winding 634, coupled to the primary winding 630, is provided connected to a pair of resistors 635 and 636 at each end thereof to the opposite inputs of an amplifier 640. One of the inputs of the amplifier 640 is connected through a resistor 641 to the ground line 602. The other input of the amplifier 640 is connected through a parallel feedback circuit consisting of a capacitor 642 and a resistor 643 to the output 644 of the amplifier 640. Connected across terminals of the amplifier is a capacitor 645. The output 644 of the amplifier 640 is connected to one of the inputs of another amplifier 646. The other input of the amplifier 646 is connected through a resistor 647 to the ground line 602. The input of the amplifier 646 which is connected to the output 644 of amplifier 640 is also connected through a feedback circuit consisting of parallel connected capacitor 651 and resistor 652 to the wiper 653 of a potentiometer 654. One end of the potentiometer 654 is connected at the output 655 of the amplifier 646 and the other end of the potentiometer 654 is connected through a resistor 660 to ground line 602. A capacitor 661 is connected across terminals of the amplifier 646. The output 655 of the amplifier 646 constitutes the output 74 of the receiver amplifier 73. The amplifiers 646 and 640 are connected to a negative voltage power line 665, which is connected through a resistor 666 to the negative 12 volt terminal of a regulated power supply, while the amplifier 646 and 640 are also connected to a positive power line 667, which is connected through a resistor 668 to the positive 12 volt output of the regulated power supply. The power line 667 is connected through a pair of capacitors 671 and 672 to the ground line 602, while the negative power line 665 is connected through a pair of filter capacitors 673 and 674 to the ground line 602.

The ultrasonic mixer 75 has an input 701 connected to the output 74 of the amplifier 73. The input 701 is connected through a capacitor 702 to the base 703 of an NPN transistor 704, which has its collector 700 connected through a resistor 705 to the positive line 667. The base 703 of transistor 704 is also connected to the positive line 667 through a resistor 707 and to the negative voltage line 665 through a resistor 708. The emitter 709 of transistor 704 is connected to the base 703 of the transistor 704 through a capacitor 710. The emitter 709 of transistor 704 is also connected through a resistor 714 to the negative line 665 and to the emitter 717 of an NPN transistor 718. The collector 719 of transistor 718 is connected through a resistor 720 to the collector 700 of the transistor 704. The base 723 of transistor 718 is connected through a capacitor 724 to the emitter 717 of the transistor 718. A resistor 726 is connected between the base 723 of transistor 718 and the positive line 667. The base 723 of transistor 718 is connected through a capacitor 729 to the input 77 which is connected to the output 51 of the oscillator 50. The mixer output is developed through the collector 719 of transistor 718, which is connected through a resistor 740 to a node 741. The node 741 is connected through a capacitor 742 to the ground line 602 and through a resistor 743 to the base 745 of a transistor 746, which has its collector 744 connected to the positive line 667. The base 745 of transistor 746 is connected through a capacitor 747 to the ground line 602 and through a capacitor 748 to the emitter 749 of the transistor 746. The emitter 749 is connected through a resistor 750 and a resistor 751 to the negative line 665. The juncture of resistor 750 and 751 is connected through a resistor 753 to the mixer output 78 and through capacitor 754 into ground line 602. The output 78 is also connected to a capacitor 755 to the ground line 602.

The ultrasonic doppler amplifier 80, the ultrasonic band pass filter 82 and the detector 87 are illustrated in FIG. 6. The amplifier 80 includes an input 801 connected to the output 78 of the mixer 75. The input 801 is connected through a capacitor 802 and a resistor 803 to the input 804 of an operational amplifier 805. The junction of the capacitor 802 and resistor 803 is connected to a ground line 810 through a resistor 807. The input 804 of amplifier 805 is connected to the ground line 810 through a capacitor 811. The opposite input 812 of the amplifier 805 is connected to the ground line 810 to a parallel circuit consisting of a resistor 815 and a capacitor 816. Connected across terminals of the amplifier 805 is a capacitor 817. The output 820 of the amplifier 805 is connected through a resistor 821 to the ground line 810 and to the input 804 through a feedback network consisting of a resistor 820 connected in series with a parallel circuit consisting of a capacitor 823 and a resistor 824.

The filter portion 87' of the filter and detector section 82 and 87 of the circuit of FIG. 6 includes an input 81 connected to the output 820 of the amplifier 80. The input 81 is connected through a capacitor 831 and a resistor 832 to the input 833 of operational amplifier 834. The opposite input 835 of the amplifier 834 is connected to the ground line 810 through a resistor 837. The junction of the capacitor 831 and the resistor 832 is connected to the ground line 810 through a resistor 838. The output 841 of the amplifier 834 is connected through a feedback resistor 842 to the input 833 of the amplifier 834. Connected across internal terminals of the amplifier 834 is a capacitor 843. Also connected in a feedback path between the output 841 and the input 833 of the amplifier 834 are a pair of series connected resistors 845 and 846 connected at their junction to the ground line 810 through a capacitor 847. Similarly connected in a feedback loop between the output 841 and input 833 of the amplifier 834 are a pair of series connected capacitors 851 and 852 connected at their junction to the ground line 810 through a resistor 853. The three feedback paths around the amplifier 834 cause the amplifier to operate as a band pass filter and determine the passband of that filter. This filter is tuned to the center of the ultrasonic doppler signal band which is 35 hz in the preferred embodiment. Most intruder movements, it has been found, produce doppler signal spectra having a substantial amplitude at this frequency. The output 841 of the amplifier 834 is connected to the input node 860 of an envelope detector and voltage doppler through a series circuit consisting of a resistor 861 and a capacitor 862. The node 860 is connected to the anode of a diode 863 which has its cathode connected to the ground line 810. The node 860 is also connected to the cathode of another diode 864 which has its anode connected through a resistor 865 and a resistor 866, to the input 867 of an operational amplifier 868. The junction of the resistors 865 and 866 is connected to ground through a parallel circuit consisting of a resistor 869 and a capacitor 870. The amplifier 868 has a capacitor 880 connected across internal terminals thereof and a feedback circuit connected between the output 88, which is the output of the detector 87 of the amplifier 868 and the input 867 of the amplifier 868. This feedback system includes a parallel circuit consisting of a capacitor 882 and a resistor 883. The amplifier 868 is provided with an opposite input 885 which is connected to the output of a noise cancelling circuit 889. The noise cancelling circuit 889 reduces the possibility of false alarms caused by broad band noise normally centered about the carrier frequency of the received signal and which spreads into the doppler frequency band of interest, and is predominant near the low frequency end of the doppler spectrum. If the broad band noise is strong enough, it can appear as a doppler signal in the signal channel pass band. The provision of the noise channel 889, or the bucking channel, as it is sometimes referred to in the art, operates to recognize this broad band noise by sampling the noise at a point in its spectrum outside of the pass band of the signal channel, and to use the output of this noise channel to cancel the signal from the signal channel. In this way broad band noise which appears strong at both channels can be recognized and cancelled so that only a signal from an intruder which is predominant in the signal channel will cause the alarm to be triggered. The noise channel frequency is selected between the signal channel and the carrier band where the noise will be more predominant, and the relative component values of the channel circuits can be selected to optimize the noise cancellation. The noise channel frequency in the embodiment illustrated is chosen at approximately 5 hz.

The noise channel includes an input 892 connected to the output 820 of the amplifier 80. The input 892 is connected through a potentiometer 893 to the ground line 810. The wiper 894 of the potentiometer 893 is connected through a resistor 895 to the input 896 of an operational amplifier 897. The opposite input 898 of the amplifier 897 is connected through a resistor 899 to the ground line 810. A capacitor 901 is connected across internal terminals of the amplifier 897. The output 902 of the amplifier 897 is connected through a feedback resistor 903 to the input 896 of the amplifier 897. Further feedback paths between the output 902 and the input 896 include series connected resistors 905 and 906 connected at their junction through a capacitor 907 to the ground line 810. A further feedback path is provided through the series connected capacitors 911 and 912 which are connected at their junction through a resistor 913 to the ground line 810. The output 902 of the amplifier 897 is connected through a series RC circuit consisting of a resistor 914 and a capacitor 915 to an envelope detector and voltage doubler circuit having an input at node 917. Node 917 is connected to the anode of a diode 918 which has its cathode connected to the ground line 810. The node 917 is also connected to the cathode of a diode 919 which has its anode connected through a resistor 920 in series with a resistor 921 to the input 885 of the amplifier 868. The juncture of the resistors 920 and 921 is connected through a capacitor 925 to the ground line 810, while the juncture of the resistor 921 and the input 885 of amplifier 868 is connected to the ground line 810 through a capacitor 926 which is connected in parallel with a resistor 927.

The amplifiers 805 and 897 are provided with terminals for connection to power lines which are labeled A and B. The A terminals connect through a resistor 931 to the positive 12-volt power output of a power supply and also through a capacitor 932 to ground. Similarly, the B terminals of the amplifiers connect through a resistor 933 to the minus-12 volt power supply output terminal and through a filter capacitor 934 to ground. In like manner, the amplifiers 868 and 834 are provided with power terminals labeled C and D. The C terminals connect through a resistor 939 to the positive 12 volt power supply output and through a filter capacitor 940 to ground. Similarly, the D terminals connect through a resistor 941 to the negative 12 volt power supply output and also through a filter capacitor 942 to ground.

Referring to FIG. 7, the ultrasonic Schmitt trigger 89 has an input connected to the output 88 of the detector 87. It includes an NPN transistor 943 having its base connected to the output 88 of the detector 87, and an emitter connected through a resistor 944 to ground. The collector of the transistor 943 is connected through a resistor 945 to a positive 12 volt regulated supply. The collector of the transistor 943 is also connected through a resistor 946 to the base of an NPN transistor 947. This base is also connected through a resistor 948 to ground. The emitter of the transistor 947 is connected to ground, while the collector of the transistor 947 is connected through a resistor 949 to the positive 12 volt supply. The collector of the transistor 947 is further connected to the cathode of the diode 958 which has its anode connected to the base of a PNP transistor 936 which has its emitter connected to the +12 volt supply and its collector connected through a pair of resistors 937 and 938 to ground. The junction of resistors 937 and 938 is connected to the input 41 of the AND-gate 38.

The AND-gate 38 is illustrated in the embodiment shown in FIG. 7 is a NOR-gate 950 which is the AND-gate equivalent for the negative signal outputs which the specific Schmitt trigger circuits 35 and 89 produce. The NOR-gate 950 includes an RF input 36 which admits the doppler pulses from the RF section, and the ultrasonic input 41 which admits a constant threshold signal from the ultrasonic section. The output of the NOR-gate is the gate output line 39 which is connected to the clock input of the accumulator counter 40. The accumulator is illustrated in one form as a two flip-flop register which is operative to count a total of three pulses and to emit an alarm signal on the output 43. The accumulator 40 includes a first flip-flop 952 and a second flip-flop 953. Both of the flip-flops have their J and K inputs connected to a source of positive signal so that they will be energized by the presence of the clock pulse at the clock inputs thereof. The clock input 951 of the accumulator 940 is the clock input of the first flip-flop 952. When the first pulse passes through the AND-gate 38, the flip-flop 952, which is normally in the OFF condition with a zero signal at its positive output or Q output 954 and a one signal at its negative output or $\overline{Q}$ output 955, will switch to the ON state, and the $\overline{Q}$ input 955 will switch to the OFF state, generating a negative "set" pulse through a differentiating capacitor 959 at the input 45 of the timer 46. This causes the flip-flop 960 in the timer 46 to set to the ON state, energizing a one-shot multivibrator 961. The second pulse through the gate 38 will switch the flip-flop 952 to the OFF state and cause a signal to pass from the output 954 of the flip-flop 952 to the clock input 965 of the flip-flop 953, causing it to switch to the ON state. The third pulse through the AND-gate will again set the flip-flop 952 to the ON condition. When both flip-flops 952 and 953 are in the ON condition, the output 43 of the counter 40, which is the output of a NAND-gate 969 having a pair of inputs 970 and 971 connected to the respective outputs of the flip-flops 952 and 953, switches to the zero state. This negative going signal at the output 43 will switch the intruder alarm circuit 44 to the ON condition.

After a predetermined time of, for example, 30 seconds, as may be determined by a presetting of the one-shot multivibrator 961, a pulse will pass through the capacitor 973 which is connected between the output of the one-shot 961 and the input of an OR-gate 977. The output of the OR-gate 977 is connected to the reset terminals 974 and 975 of the respective flip-flops 952 and 953. This pulse will reset both of the flip-flops to zero condition. Thus, if three pulses do not pass through the gate in the prescribed time determined by the one-shot multivibrator 961, the counter will be cleared and reset to zero. Only three pulses within the prescribed time after this counter is reset to zero will be effective to actuate the alarm. The flip-flop 960 locks out additional pulses and prevents resetting of the one-shot multivibrator 961. The flip-flop 960 has its reset terminal 976 also connected in parallel with the reset terminals 974 and 975 of the flip-flops 952 and 953, to the output of the OR-gate 977.

The output 43 of the accumulator 40 is connected to the delayed alarm reset output 49 which connects to another input of the OR-gate 977 to reset the timer 46 and the accumulator 40 at a delayed time after the alarm is triggered. The delay output 49 includes a time delay circuit 978 to provide the signal delay which is picked at 2 seconds in the embodiment shown.

The intruder alarm switching circuit 44 has an input terminal connected to the output 43 of the accumulator 40. The input terminal 979 is connected through a resistor 980 to the base of an NPN transistor 981 which has its emitter connected to ground. The collector of the transistor 981 is connected through a resistor 982 through a relay winding 983 to a positive voltage source 984. Connected across the winding 983 is a capacitor 985. The relay winding 983 actuates a normally open relay contact 983' connected in series with a resistor 986 and a second relay winding 987 between the power source 984 and ground. The relay 987 actuates relay contacts 987' which are normally closed contacts connected in series with a power source 988 and the alarm 989. In the non-alarm state, the accumulator output 43 is in a positive voltage state, and therefore the transistor 981 is conducting and the relay 983 is energized maintaining the contacts 983' in the closed condition as illustrated. This causes the winding 987 to be energized which holds the contacts 987' in the open condition. When an alarm occurs, the output 43 goes to zero, the transistor 981 is rendered nonconductive, the relay 983 is de-energized opening the contacts 983' de-energizing the relay 987, causing the contacts 987' to close, energizing the alarm 989.

Referring to FIG. 8, the power supply of the system is diagrammatically illustrated. This includes the regulated power supply 990 having AC input terminals 991 connectable to a source of AC power. The power supply operates a battery charger 992 which charges an emergency storage battery 993. The outputs of the power supply include regulated sources of plus 12 volts, minus 12 volts, minus 19 volts, and ground potential, illustrated by terminals 994, 995, 996, and 997, respectively.

Whereas the accumulator 40 of the embodiment of FIG. 7 is a digital accumulator, an analog accumulator circuit which constitutes an alternative embodiment is illustrated in FIG. 9. The gate 38 is illustrated with its inputs 36 and 41 connected each through an inverter amplifier 1001 and 1002, to a different input of a NAND-gate 1003, which has its output connected through an inverter amplifier 1004 to the output 39 of the gate 38. The output 39 of the gate 38 connects through a diode 1006 to the input of the accumulator 40. The accumulator 40 includes a resistor 1010 connected between the input and the base of an NPN transistor 1011, the emitter of which is connected to a ground line 1012. The base of the transistor 1011 is connected through a resistor 1013 to the ground line 1012. The collector of the transistor 1011 is connected to a resistor 1014 to a positive voltage line 1015, which is connected through a pair of resistors 1016 and 1017 to the positive 12 volt supply which is connected through a capacitor 1018 to the ground line 1012. The line 1015 is also connected to a capacitor 1019 to the ground line 1012. The collector of the transistor 1011 is connected to the base of an NPN transistor 1021, which has its emitter connected through a resistor 1022 to the ground line 1012. The collector of the transistor 1021 is connected through a resistor 1023 to the positive line 1015 and through a capacitor 1024 to the cathode at a diode 1025 which has its anode connected to the ground line 1012. The cathode of the diode 1025 is also connected to the anode of the diode 1026 which has its cathode connected to the anode 1027 of the silicon control switch 1028, which has its cathode connected through a resistor 1030 to the ground line 1012. The anode 1027 of the SCS 1028 is connected through a capacitor 1031 to the ground line 1012, and through a resistor 1033 to the collector of a transistor 1035, which has its emitter connected to the ground line 1012. The base of the transistor 1035 is connected to ground through a capacitor 1036 and also through a parallel resistor 1037. The gate of the SCS 1028 is connected through a resistor 1041 to the positive line 1015 and through a resistor 1042 to the ground line 1012. The cathode of the SCS constitutes the output 43 of the accumulator 40. The output 43 of the accumulator 40 is connected to the anode of a diode 1051, which has its cathode connected through a resistor 1052 to the base of an NPN transistor 1053, which has its emitter connected to the ground line 1012 and its collector connected through a resistor 1054 to the positive line 1015. The base of the transistor 1053 is connected through a capacitor 1056 to the ground line 1012, The base of the transistor 1053 is connected through a resistor 1061 to the collector of a PNP transistor 1062, which has its emitter connected to the positive line 1015, and its base connected to the anode of a diode 1063, which in turn has its cathode connected to a resistor 1064 and through a capacitor 1065 to the collector of the transistor 1053. The junction of the resistor 1064 and the capacitor 1065 is connected through a resistor 1067 to the positive line 1015. The collector of the transistor 1053 is connected to a resistor 1069 to the base of a transistor 1070 which has its emitter connected to the ground line 1012 and its collector connected through a relay winding 1075 and a resistor 1076 to the positive line 1015. Connected across the winding 1075 is a diode 1078 having its anode to the collector of the transistor 1070. The contact 1075' of the relay 1075 are normally opened contacts which close a circuit connecting a power source 1079 in series with an alarm bell 1077.

The timer 46 includes the flip-flop 960 and one-shot 961. The flip-flop 960 has a trigger input 1100 by which the flip-flop is set to the ON condition, which connects to the input 39 of the accumulator 40. The flip-flop 960 includes a pair of NPN transistors 1101 and 1102. The transistors have their emitters connected to a ground line 1103 and their collectors connected through a pair of resistors 1105 and 1106, respectively, to a positive voltage line 1104, which connects to the positive voltage line 1015 of the accumulator. The input 1100 is connected through a capacitor 1110 to the cathode of a diode 1111, which has its anode connected to the ground line 1103, and its cathode further connected through a resistor 1112 to the anode of a diode 1113 which has its cathode connected to the base of the transistor 1101, which is in turn connected to the ground line 1103 through a resistor 1115, and to the collector of the transistor 1102 to a resistor 1116. The base of the transistor 1102 is connected to the ground line 1103 to a resistor 1117 and through a resistor 1118 to the collector of a transistor 1101. The base of the transistor 1102 is also connected through a resistor 1120 to the reset input 976 of the flip-flop 960. The reset input 976 is connected to the cathode of a diode 1123, which has its anode connected to the output 43 of the accumulator 40. The collector of the transistor 1102 is connected to the anode of a diode 1125, which has its cathode connected through a resistor 1127 to the positive line 1104 and through a capacitor 1128 to the ground 1103. The positive output 1130 of the flip-flop 960 is connected to the collector of the transistor 1101. This output is connected through a capacitor 1131 and a resistor 1132 to the base of the transistor 1035 of the accumulator 40. The output 1130 of the flip-flop 960 is also connected through a resistor 1041 to the base of a transistor 1042 at the input of the one-shot 961. The base of the transistor 1042 is connected through a resistor 1043 and also through a capacitor 1044 to the ground line 1103. The emitter of the transistor 1142 is connected to the ground line 1103 and the collector of the transistor 1142 is connected through a resistor 1145 to the anode of an SCR 1150. The anode of the SCR 1150 is connected through a capacitor 1151 to the ground line 1103, and through a resistor 1152 to the positive line 1104. The cathode of the SCR 1150 is connected through a resistor 1161 to the ground line 1103 and constitutes the output 47 of the timer 46. This output is connected to the anode of a diode 1163, which has its cathode connected to the reset input 976 of the flip-flop 960. The gate of the SCR 1150 is connected to ground through a resistor 1167 and to the cathode of the diode 1168, which has its anode connected to a resistor 1169 to the positive line 1104 and through a resistor 1170 to the ground line 1103.

The operation of the circuit in FIG. 9 is defined as follows: the correlated pulses appear at the input 39 of the accumulator and the first pulse proceeds through the flip-flop input 1100 to set the flip-flop to the ON condition, in which the output line 1130 goes negative. This causes a signal to pass to the input of the one-shot, through the resistor 1141 to turn off the transistor 1142, which has been conducting. This allows the capacitor 1151 to charge through the resistor 1152 at some predetermined rate. The input on the terminal 39 of the accumulator 40 will be inverted to a negative going pulse by the transistor 1011, which will momentarily turn off the transistor 1021. The momentary turning off the transistor 1021 will cause the capacitor 1031 to charge to a level of approximately 4 volts, through the resistor 1023 to the capacitor 1024 and the diode 1026. Subsequent pulses will charge the capacitor 1031 further, first to 6 volts, and then to 8 volts, at which point the SCR 1028 will become conductive, due to the bias on its gate, and an alarm signal will be emitted at the output 43 of the accumulator 40 through the diode 1051 to switch ON the transistors 1053 and 1070 of the alarm circuit 44, to energize the relay 1075, which closes the power circuit to the bell alarm 1077. This positive signal at the output 43 of the accumulator 40 will also reset the flip-flop 960 through the reset input 976.

If, however, the one-shot capacitor 1151 charges to the firing voltage of the SCR 1150 as set by the bias on its gate and cause it to conduct, a positive voltage will appear on line 47 resetting the flip-flop 960. The positive going output of the flip-flop on line 1130 will then pass through the capacitor 1131 and momentarily apply current to the base of the transistor 1035 of the accumulator 40, causing the transistor 1035 to conduct to discharge the capacitor 1031 and to reset accumulator 40.

I claim:

1. An intrusion alarm system comprising:
   an electromagnetic space alarm sub-system including:
   a radio frequency transmitter for transmitting electromagnetic energy into an area being surveyed,
   an antenna for receiving said radiation as reflected from objects within the area,
   a mixer having inputs connected to said transmitter and said antenna for producing at its output a doppler frequency signal derived from said radiated energy and from the energy reflected from a moving intruder, and
   means for producing doppler frequency pulses from the output of said electromagnetic sub-system mixer;
   an ultrasonic space alarm sub-system including:
   means for radiating ultrasonic energy into said area,
   means for receiving said energy as reflected from objects within said area,
   means for producing a signal proportional to the doppler frequency component of the received reflected ultrasonic energy within a given doppler frequency band, and
   means for producing a threshold signal when said detected signal exceeds a predetermined threshold value;
   a correlation sub-system including:
   a coincidence circuit having inputs for receiving said electromagnetic doppler pulses and said ultrasonic threshold signal, and having an output bearing doppler frequency pulses upon the coincidence of said electromagnetic doppler frequency pulses and said ultrasonic threshold signal at the inputs of said coincidence circuit,
   accumulator means connected to the output of said coincidence circuit and operative to generate an output signal in response to a predetermined number of pulses at the accumulator input, and
   alarm means connected to the output of said accumulator and operative to signal an alarm in response to the output signal from said accumulator.

2. An alarm system according to claim 1 wherein said accumulator is an analog accumulator.

3. An alarm system according to claim 1 wherein said accumulator is a digital accumulator.

4. An alarm system according to claim 1 wherein said coincidence sub-system further comprises: an interval timer for generating at its output a reset pulse at a predetermined time interval after a pulse at its its input, said timer having its input connected to the output of said coincidence circuit and having its output connected to a reset input of said accumulator so as to reset said accumulator in response to said reset pulse.

5. An intrusion alarm system comprising:
   a first space alarm sub-system including:
   a transmitter for transmitting energy into an area being surveyed,
   an antenna for receiving said radiation as reflected from objects within the area,
   a mixer having inputs connected to said transmitter and said antenna for producing at its output a doppler frequency signal derived from said radiated energy and from the energy reflected from a moving intruder, and
   means for producing doppler frequency pulses from the output of said first sub-system mixer;
   a second space alarm sub-system including:
   means for radiating energy into said area, said energy having properties different than the energy radiated by said first sub-system,
   means for receiving said energy as reflected from objects within said area,
   means for producing a signal proportional to the doppler frequency component of the received reflected energy within a given doppler frequency band, and
   means for producing a threshold signal when said detected signal exceeds a predetermined threshold value;
   a correlation sub-system including:
   a coincident circuit having inputs for receiving said doppler pulses from said first sub-system and said threshold signal from said second subsystem, and having an output bearing doppler frequency pulses corresponding to said doppler frequency pulses from said first sub-system upon the coincidence of said doppler frequency pulses from said first sub-system and said threshold signal from said second sub-system at the inputs of said coincidence circuit, accumulator means connected to the output of said coincidence circuit and operative to generate an output signal in response to a predetermined number of pulses at the accumulator input; and alarm means connected to the output of said accumulator and operative to signal an alarm in response to the output signal from said accumulator.

6. An intrusion alarm system comprising:

a first space alarm sub-system including:

a transmitter for transmitting energy into an area being surveyed, an antenna for receiving said radiation as reflected from objects within the area, a mixer having inputs connected to said transmitter and said antenna for producing at its output a doppler frequency signal derived from said radiated energy and from the energy reflected from a moving intruder, and means for producing doppler frequency pulses from the output of said first sub-system mixer;

a second alarm sub-system operative to generate an output in response to an alarm condition;

a correlation sub-system including:

a coincident circuit having inputs for receiving said doppler pulses from said first sub-system and said output signal from said second sub-system, and having an output bearing a signal corresponding to the coincidence of said doppler frequency pulses from said first sub-system and the output signal from said second sub-system at the inputs of said coincidence circuit, accumulator means connected to the output of said coincidence circuit and operative to generate an output signal in response to a predetermined number of pulses at the accumulator input; and alarm means connected to the output of said accumulator and operative to signal an alarm in response to the output signal from said accumulator.

7. An alarm system according to claim 6 wherein said doppler frequency lies in or near the sub-audible range of frequencies.

8. An alarm system according to claim 7 wherein said radiated energy is electromagnetic radiated energy in the order of approximately 915 MHz and said doppler frequency is approximately 1–10 Hz.

* * * * *